Patented Mar. 31, 1936

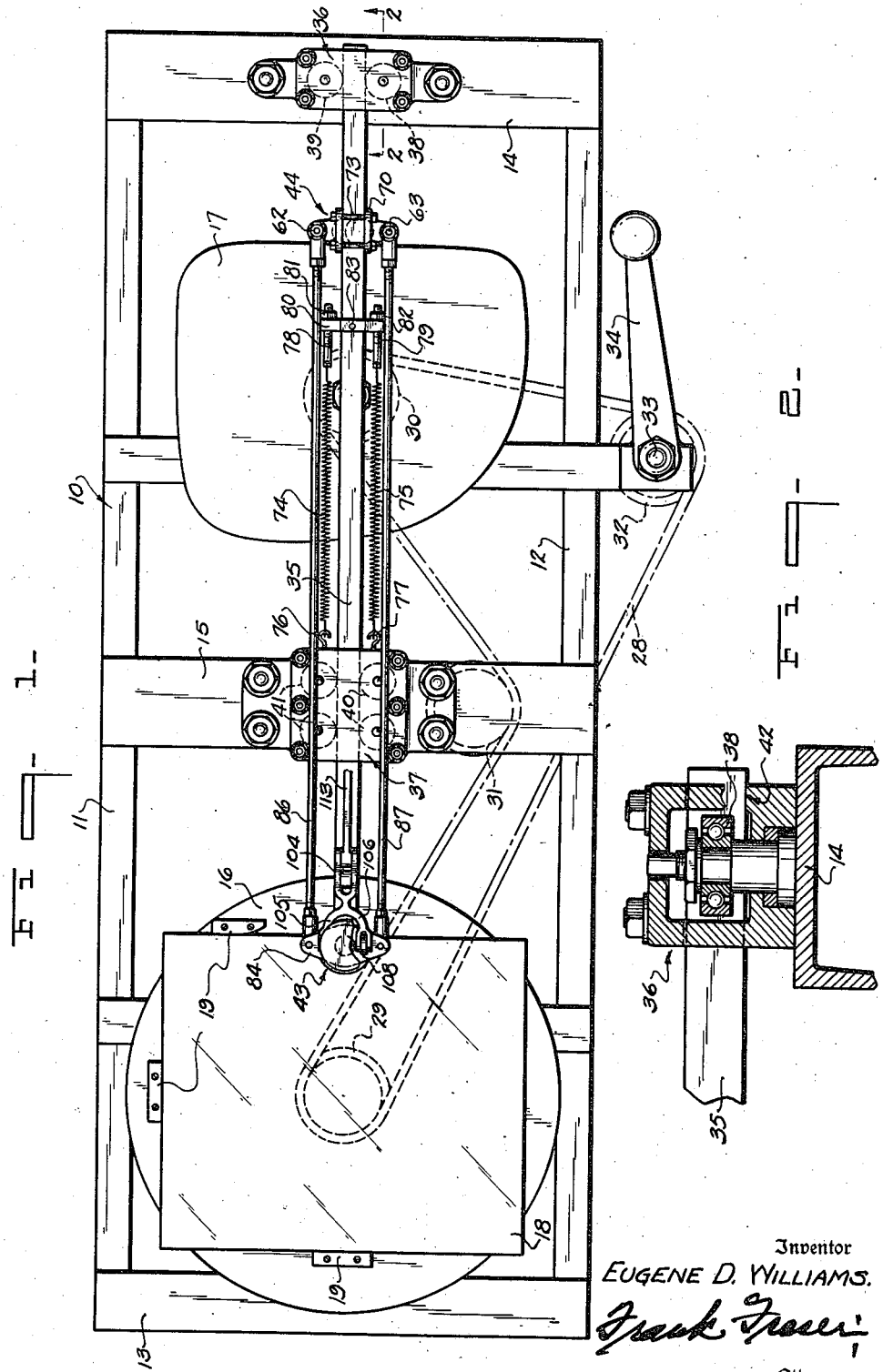

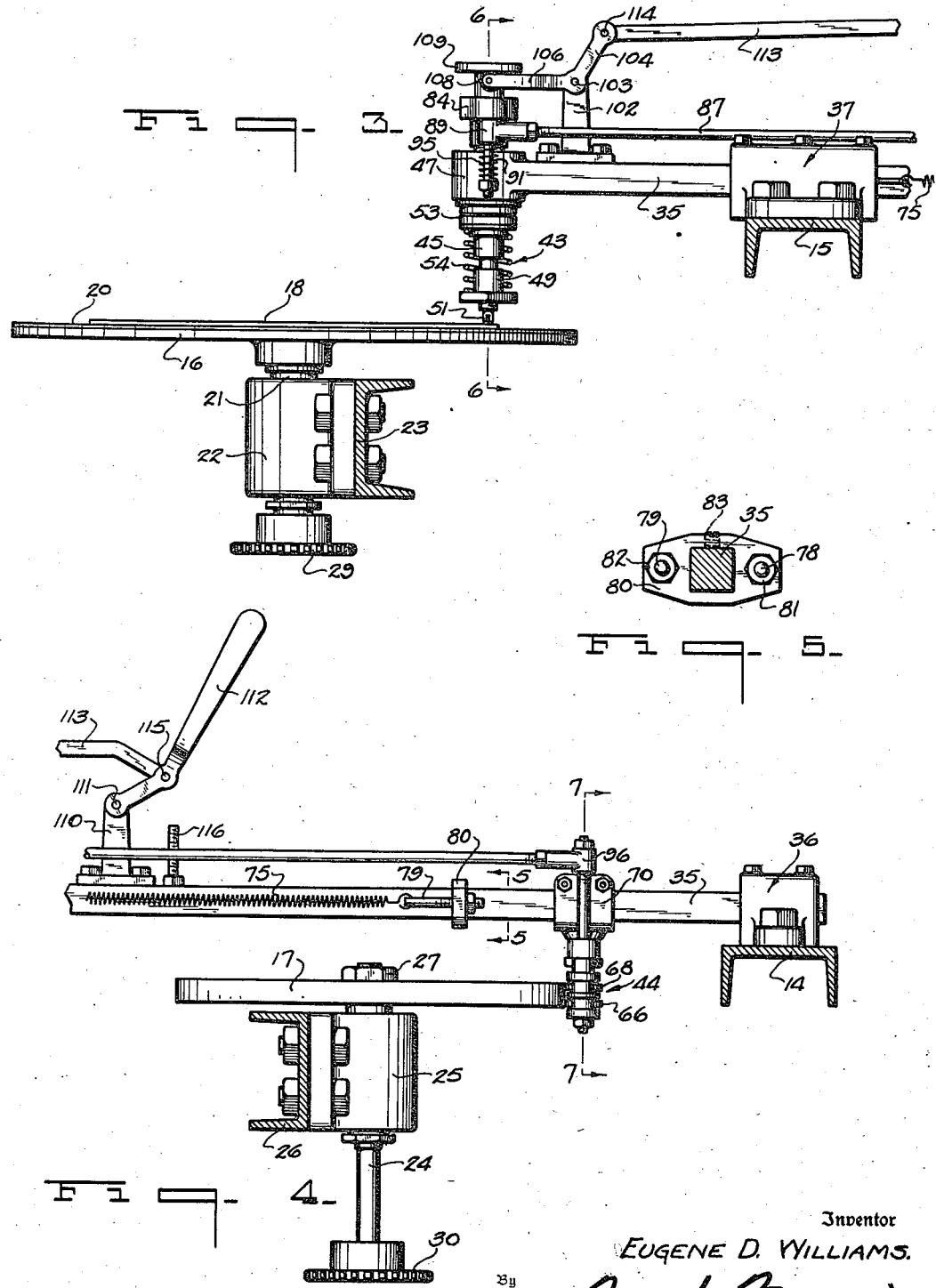

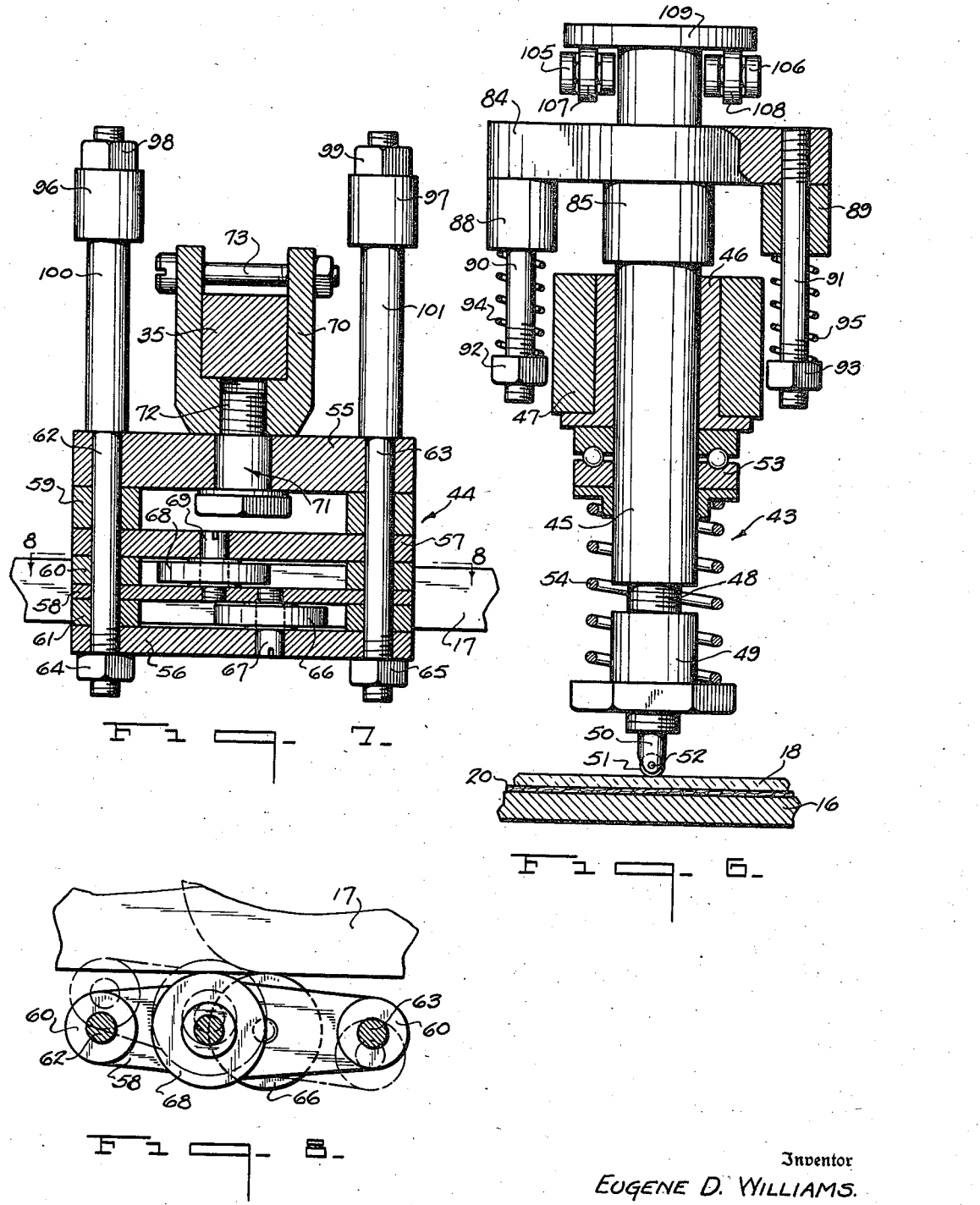

2,035,581

UNITED STATES PATENT OFFICE 2,035,581

CUTTING MACHINE

Eugene D. Williams, Toledo, Ohio, assignor to Libbey-Owens-Ford Glass Company, Toledo, Ohio, a corporation of Ohio Application February 15, 1935, Serial No. 6,689

9 Claims. (Cl. 33—27)

The present invention relates to improvements in cutting machines generally and more particularly to a machine designed primarily for the cutting of glass sheets or plates, although it is of course not restricted to such use.

An important object of the invention is to provide a cutting machine for cutting out from glass sheets or plates forms or sections of regular or irregular outline rapidly, accurately, and economically.

Another object of the invention is the provision of a cutting machine of the above character embodying a rotatable support for the sheet to be cut and a rotatable template of a predetermined shape and size, together with tracer means associated with said template and operatively connected with a cutting tool in such a manner that, upon proper rotation of the support and template, the said tool will cut a faithful and accurate reproduction of the shape of said template.

A further object of the invention is the provision of a cutting machine of the above character wherein the tracer means and cutting tool are operatively connected together in such a manner that the cutting edge of the cutting tool will always be maintained in a line tangent to that of the cut whereby the shape of the template will be accurately transferred to the cut sheet.

Other objects and advantages will become more apparent during the course of the following description when taken in connection with the accompanying drawings.

In the drawings wherein like numerals are employed to designate like parts throughout the same, Fig. 1 is a plan view of a cutting machine constructed in accordance with the present invention, Fig. 2 is a detail section taken substantially on line 2—2 of Fig. 1, Fig. 3 is a side elevation of one end of the cutting machine, Fig. 4 is a similar view of the opposite end of said machine, Fig. 5 is a detail section taken substantially on line 5—5 of Fig. 4, Fig. 6 is a vertical section taken substantially on line 6—6 of Fig. 3, Fig. 7 is a vertical section taken substantially on line 7—7 of Fig. 4, and Fig. 8 is a horizontal section taken substantially on line 8—8 of Fig. 7.

With reference to the accompanying drawings, the cutting machine herein provided comprises a substantially rectangular supporting frame-work 10 including the spaced parallel longitudinally extending side members 11 and 12 connected at their opposite ends by the end members 13 and 14 and intermediate their ends by a cross member 15. The frame-work 10 may be supported by means of suitable legs, posts, or the like (not shown).

Mounted adjacent one end of the frame-work 10 is a horizontal rotatable support or table 16 while mounted adjacent the opposite end of said frame-work is a horizontal rotatable pattern or template 17 having the same configuration which is intended to be imparted to the glass sheet to be cut. The glass sheet 18 to be cut is secured upon the table 16 by suitable clamps 19 and, if desired, the surface of said table may be covered with a pad 20 (Fig. 6) of felt or the like to minimize scratching of the glass.

The sheet supporting table 16 is mounted upon the upper end of a vertical shaft 21 (Fig. 3) journaled in a bearing 22 carried by a horizontal cross beam 23 which forms a part of the supporting frame-work 10. The template 17 is carried upon the upper end of a vertical shaft 24 (Fig. 4) journaled in a bearing 25 secured to a cross beam 26 also constituting a part of the supporting frame-work. The template 17 may be removably secured upon the shaft 24 by a nut or the like 27, with the result that the template may be readily removed when desired and replaced by a template of different shape and size.

The table 16 and template 17 are adapted to be simultaneously rotated in timed relation to each other, and this may be accomplished by means of a chain and sprocket drive including a sprocket chain 28 trained about a sprocket 29 keyed to the work table shaft 21 and also about a sprocket 30 keyed to the template shaft 24, said sprocket chain being also trained about additional sprockets 31 and 32 suitably mounted upon the frame-work 10. The sprocket 32 is carried by a shaft 33 to which is fixed a hand crank or the like 34 by means of which the operator may rotate the sprocket 32 and thereby effect simultaneous rotation of the work table 16 and template 17 through the sprocket chain 28 and sprockets 29, 30 and 31. Since the sprockets 29 and 30 are of the same size, the work table and template will rotate at the same speed.

Arranged above the frame-work 10 and extending longitudinally thereof is a horizontal supporting member or cutter bar 35 substantially square in cross section and slidably mounted in housings 36 and 37 bolted or otherwise suitably secured to the cross beams 14 and 15 respectively. Journaled in the housing 36 are the freely rotatable rollers 38 and 39 engaging opposite side faces of the cutter bar 35 while arranged in the housing 37 are the two pairs of rollers 40 and 41 also bearing against opposite side faces of the said cutter bar. The provision of the rollers 38, 39 and 40, 41 not only facilitates longitudinal sliding movement of the cutter bar but also prevents any lateral movement thereof. The cutter bar is slidably supported within the housing 36 upon the bottom 42 thereof, as shown in Fig. 2, and may be similarly supported in the housing 37.

Carried at the inner end of the cutter bar 35 is the cutting unit 43 positioned above the table 16, while mounted upon the said bar adjacent the opposite or outer end thereof is the tracer means 44 associated with the template 17. The cutting unit 43 includes a vertical tool post 45 slidable vertically through a bushing 46 fitted in the bearing portion 47 formed at the inner end of the cutter bar. The post 45 is reduced in diameter at its lower end and screw threaded as at 48 to receive thereon a nut 49. Carried at the lower end of the tool post is a cutter holder 50 provided with a freely rotatable steel cutting wheel 51 mounted upon a horizontal pin 52. Encircling the post 45 between the nut 49 and a ball bearing assembly 53 is a compression spring 54 which serves to normally urge the said post downwardly and maintain the cutting wheel 51 in yieldable engagement with the glass sheet 18 to be cut.

The tracer means 44 comprises, as best shown in Figs. 7 and 8, the upper and lower elongated horizontal plates 55 and 56 respectively and the similarly shaped intermediate plates 57 and 58, said plates being maintained in properly spaced relation at each end thereof by the three discs 59, 60 and 61 arranged therebetween and clamped together by bolts 62 and 63 which pass vertically through the said plates and discs and carry nuts 64 and 65 at their lower ends.

Positioned between the plates 56 and 58 is a guide roller 66 freely mounted upon a vertical pin 67, while arranged between the plates 57 and 58 is a second horizontal guide roller 68 carried by a pin 69. The pins 67 and 69 are offset with respect to one another so that the guide rollers 66 and 68 engage the edge portion of the template 17 at two spaced points.

The tracer means 44 is pivotally secured to the cutter bar 35 by means of a substantially U-shaped strap 70 and a screw 71, said screw passing loosely upwardly through an opening in the top plate 55 and being threaded within the bottom of the strap 70 as shown at 72. The upper ends of the U-shaped strap 70 are connected together by bolts 73 which serve to clamp the tracer means to the cutter bar.

The guide rollers 66 and 68 of the tracer means 44 are maintained in engagement with the edge of the template 17 by a pair of coil springs 74 and 75 fastened at their inner ends to hooks 76 and 77 respectively carried by the housing 37 and at their opposite ends to screws 78 and 79 which pass loosely through a substantially rectangular block 80 carried by the cutter bar and have nuts 81 and 82 threaded thereupon outwardly of said block. The block 80 is provided with an opening for receiving the cutter bar therethrough and is fixed to the said bar by a set screw or the like 83. With this arrangement, it will be apparent that the action of the springs 74 and 75 will tend to normally urge the cutter bar 35 inwardly and to maintain the guide rollers 66 and 68 in constant engagement with the edge of the template, although upon rotation of the said template the guide rollers can be moved outwardly against the action of the springs. The tension of the springs may be varied upon proper adjustment of the nuts 81 and 82.

Briefly stated, the operation of the machine as thus far described is as follows: The sheet of glass 18 to be cut is first properly positioned upon the table 16 and a template 17 of the desired shape and size mounted upon the upper end of shaft 24. The operator then turns the crank 34 to effect rotation of the shafts 21 and 24. Upon turning of the shaft 21, the table 16 will be rotated to provide relative movement between the glass sheet 18 and the cutting tool 51 and simultaneously the template 17 will be rotated at the same speed. The guide rollers 66 and 68 of the tracer means will ride freely over the moving edge of the template and the varying contour of said template will cause the tracer means to move bodily with or against the action of the springs 74 and 75. In other words, as the template rotates, the cutter bar 35 will be caused to move inwardly or outwardly depending upon the curvature of said template, with the springs 74 and 75 serving to maintain the guide rollers at all times in engagement with the edge of the template. Any bodily movement of the tracer means induced by the shape of the template will thus be accurately transmitted to the cutting tool. Upon a complete rotation of the table and template, the cutting tool will reproduce and cut out a section from the glass sheet 18 that is the same shape and size as the said template.

In order to effect proper cutting of the glass sheet in this manner, it is of prime importance that the cutting wheel 51 be always maintained in a line tangent to that of the cut, especially when there is a sudden change in the contour of the template. To this end, the present invention also embodies the provision of means for causing any rotary or turning movement of the tracer means to be accurately transmitted to the cutting wheel. In the embodiment illustrated, the tool post 45 extends upwardly beyond the cutter bar 35 and has secured thereto a plate 84, said plate being formed intermediate its ends with a hub 85 through which the said post extends.

Extending longitudinally of the cutter bar 35 at opposite sides thereof are the horizontal parallel rods 86 and 87 provided at their inner ends with bearing portions 88 and 89 loosely mounted upon vertical screws 90 and 91 respectively carried by and depending from opposite ends of the plate 84. Threaded upon the lower ends of the screws 90 and 91 are nuts 92 and 93 respectively while encircling the said screws are compression springs 94 and 95 bearing at opposite ends against the bearing portions 88, 89 and nuts 92, 93 and acting to urge the ends of the rods 86 and 87 upwardly and maintain them in contact with plate 84.

The opposite ends of the rods 86 and 87 are provided with bearing portions 96 and 97 through which are loosely received the bolts 62 and 63 of the tracer means. Threaded upon the upper ends of these bolts, above said bearing portions, are nuts 98 and 99, while mounted upon the bolts beneath the bearing portions are sleeves 100 and 101 upon the upper ends of which the said bearing portions are supported. With this arrangement, it will be seen that upon turning of the tracer means 44 about the axis of screw 71 as a result of the guide rollers 66 and 68 engaging a curved portion of the template, exactly the same movement will be transmitted to the tool post 45 as a consequence of which the cutting wheel 51 will always be maintained in a line tangent to the line of cut. This permits relatively sharp or small radius curves to be executed as readily as large radius curves.

To facilitate the placing of the glass sheets to be cut upon the table 16 and their subsequent removal therefrom, the cutting unit 43 is mounted for vertical movement relative to the cutter bar 35. To this end, there is carried by the cutter bar adjacent the cutting unit a vertical bracket 102 (Fig. 3) to which is pivoted as at 103 a bell crank lever 104. The forward end of said lever is substantially U-shaped to provide spaced arms 105 and 106 which are arranged at opposite sides of the tool post 45, and carried at the outer end of these arms are rollers 107 and 108 respectively arranged beneath and adapted to engage the under-surface of an annular flange 109 formed at the upper end of the tool post.

Also carried by the cutter bar 35 adjacent the opposite or outer end thereof is a second vertical bracket 110 (Fig. 4) to which is pivoted as at 111 an operating lever 112. Extending between and connecting the bell crank lever 104 and operating lever 112 is a bar 113 pivoted to the outer end of the bell crank lever as at 114 and to the operating lever 112 as at 115. With this arrangement and upon swinging of the lever 112 toward the tracer means 44 or in a clockwise direction, the bell crank lever 104 will also be swung in a clockwise direction causing the rollers 107 and 108 carried thereby to engage the flange 105 and effect the raising of the tool post 45 and incidentally the cutting wheel 51 against the action of spring 54. Upon release of the lever 112, the action of the spring 54 will cause the cutting wheel to be again lowered into engagement with the glass sheet.

In order to limit the lifting movement of the cutting wheel, there is provided a stop screw 116 (Fig. 4) carried by the cutter bar and against which the operating lever 112 is adapted to abut.

By rotating the template and work table in unison and transmitting to the cutting wheel exactly the same movement that is imparted to the tracer means, it will be readily apparent that the said cutting wheel will be caused to cut a faithful reproduction of the template from the glass sheet. Consequently, sections of circular, elliptical, or irregular outline can be rapidly, accurately, and economically cut out from the glass sheets or plates. Furthermore, since the accuracy of the cut is not dependent upon the skill of the operator, the machine can be successfully operated by relatively unskilled workmen.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass cutting apparatus, a rotatable support for the sheet to be cut, a rotatable template, a slidably mounted supporting member positioned above said support and template, a cutting unit including a cutting tool rotatably carried by said supporting member, tracer means also rotatably carried by the supporting member and engaging said template at a plurality of spaced points along the periphery thereof, means for rotating said support and template in timed relation to each other, and means connecting said tracer means and cutting tool for transmitting any rotary movement of the former to the latter.

2. In sheet glass cutting apparatus, a rotatable support for the sheet to be cut, a rotatable template, a slidably mounted supporting member positioned above said support and template, a cutting unit including a cutting tool rotatably carried by said supporting member, tracer means also rotatably carried by the supporting member and engaging said template at a plurality of spaced points along the periphery thereof, means for rotating said support and template in timed relation to each other, means for yieldably maintaining the tracer means in engagement with the template, and means connecting said tracer means and cutting tool for transmitting any rotary movement of the former to the latter.

3. In sheet glass cutting apparatus, a rotatable support for the sheet to be cut, a rotatable template, a horizontal supporting member slidably mounted above said support and template, a cutting unit including a cutting tool rotatably carried at one end of said supporting member, tracer means rotatably carried adjacent the opposite end of the supporting member and including a pair of guide rollers engaging said template at two spaced points along the periphery thereof equi-distant from the axis of rotation of the tracer means, means for rotating said support and template in timed relation to each other, and means connecting said tracer means and cutting tool for transmitting any rotary movement of the former to the latter.

4. In sheet glass cutting apparatus, a rotatable support for the sheet to be cut, a rotatable template, a horizontal supporting member slidably mounted above said support and template, a cutting unit including a cutting tool rotatably carried at one end of said supporting member, tracer means rotatably carried adjacent the opposite end of the supporting member and including a pair of guide rollers engaging said template at two spaced points along the periphery thereof equi-distant from the axis of rotation of the tracer means, means for yieldably urging said guide rollers toward and maintaining them in engagement with the template, means for rotating said support and template in timed relation to each other, and means connecting said tracer means and cutting tool for transmitting any rotary movement of the former to the latter.

5. In sheet glass cutting apparatus, a rotatable support for the sheet to be cut, a rotatable template, a horizontal supporting member slidably mounted above said support and template, a cutting unit including a cutting tool rotatably carried at one end of said supporting member, tracer means rotatably carried adjacent the opposite end of the supporting member and including a plurality of guide rollers adapted to engage said template, means for rotating said support and template in timed relation to each other, means connecting said tracer means and cutting tool for transmitting any rotary movement of the former to the latter, and means for raising and lowering the cutting tool relative to the supporting member.

6. In sheet glass cutting apparatus, a rotatable support for the sheet to be cut, a rotatable template, a horizontal supporting member slidably mounted above said support and template, a cutting unit including a cutting tool rotatably carried at one end of said supporting member, tracer means rotatably carried adjacent the opposite end of the supporting member and including a plurality of guide rollers adapted to engage said template, means for yieldably urging said guide rollers toward and maintaining them in engagement with the template, means for rotating said support and template in timed relation to each other, means connecting said tracer means and cutting tool for transmitting any rotary movement of the former to the latter, means for yieldably maintaining the cutting tool in engagement with the sheet to be cut, and means for raising and lowering the cutting tool relative to the supporting member.

7. In sheet glass cutting apparatus, a rotatable support for the sheet to be cut, a rotatable template, a slidably mounted supporting member positioned above said support and template, a cutting unit including a cutting tool rotatably carried by said supporting member, tracer means also rotatably carried by the supporting member and engaging said template at two spaced points along the periphery thereof equi-distant from the axis of rotation of the tracer means, means for rotating said support and template in timed relation to each other, and a pair of longitudinally extending rods connecting the tracer means and cutting unit for transmitting any turning movement of the former to the latter.

8. In sheet glass cutting apparatus, a rotatable support for the sheet to be cut, a rotatable template, a horizontal supporting member slidably mounted above said support and template, a cutting unit including a cutting tool rotatably carried at one end of said supporting member, tracer means rotatably carried adjacent the opposite end of the supporting member and including a plurality of guide rollers engaging said template at opposite sides of the axis of rotation of the tracer means, means for yieldably urging said guide rollers toward and maintaining them in engagement with the template, means for rotating said support and template in timed relation to each other, and a pair of longitudinally extending rods connecting the tracer means and cutting unit at opposite sides of the axes of rotation thereof for transmitting any turning movement of the former to the latter.

9. In sheet glass cutting apparatus, a rotatable support for the sheet to be cut, a rotatable template, a slidably mounted supporting member positioned above said support and template, a cutting unit including a cutting tool rotatably carried by said supporting member, tracer means also rotatably carried by the supporting member and engaging said template at opposite sides of the axis of rotation thereof, means for rotating said support and template in timed relation to each other, and means connecting said tracer means and cutting tool for transmitting any rotary movement of the former to the latter.

EUGENE D. WILLIAMS.